United States Patent [19]

De Luca

[11] Patent Number: 4,956,853
[45] Date of Patent: Sep. 11, 1990

[54] METHOD OF SERVO-CONTROLLING THE INSTANT OF REGENERATION IN A DIGITAL TRANSMISSION IN WHICH A CARRIER IS MODULATED ALONG TWO AXES IN QUADRATURE, AND APPARATUS FOR IMPLEMENTING THE METHOD

[75] Inventor: Olivier De Luca, Suresnes, France

[73] Assignee: Alcatel N.V., Amsterdam, Netherlands

[21] Appl. No.: 312,643

[22] Filed: Feb. 17, 1989

[30] Foreign Application Priority Data

Feb. 18, 1988 [FR] France .................................. 88 01923

[51] Int. Cl.$^5$ .............................................. H03D 3/24
[52] U.S. Cl. ...................................... 375/102; 328/164;
375/100; 375/120; 455/139
[58] Field of Search ........................ 375/4, 106, 39, 40,
375/102, 120, 100; 328/164; 370/20; 455/60,
139, 276, 137, 138

[56] References Cited

U.S. PATENT DOCUMENTS

| 3,444,471 | 5/1969 | French .................... | 455/139 |
| 4,261,056 | 4/1981 | Barnett et al. ............ | 455/276 |
| 4,455,663 | 6/1984 | Ragsdale .................. | 375/106 |
| 4,484,337 | 11/1984 | Leclert et al. ............ | 375/39 |
| 4,686,482 | 8/1987 | Zoetman et al. ........... | 328/164 |
| 4,687,999 | 8/1987 | Desperben et al. ........ | 375/39 |
| 4,710,975 | 12/1987 | Okamoto et al. .......... | 455/276 |

FOREIGN PATENT DOCUMENTS 080020 6/1983 Fed. Rep. of Germany .
230900 8/1987 France .
184805 6/1986 Japan .

OTHER PUBLICATIONS

"Timing Recovery in Digital Synchronous Data Receivers", K. H. Mueller et al., IEEE Transactions on Communications, vol. Com-24, No. 5, May 1976, pp. 516-530.
"Minimum Mean-Square Error Timing Recovery Schemes for Digital Equalizers", H. Sari et al., IEEE Transactions on Communications, vol. Com-34, No. 7, 7/86, pp. 694-702.

Primary Examiner—Benedict V. Safourek
Assistant Examiner—Tesfaldet Bocure
Attorney, Agent, or Firm—Christie, Parker & Hale

[57] ABSTRACT

A method of servo-controlling the instant of regeneration in a digital transmission in which a carrier is modulated along two axes in quadrature, in which the optimum instant of regeneration is sought on one of the paths (path X) by manual adjustment, the method being characterized in that two corresponding samples of the phase impulse response on the two paths are compared and the offset of the instant or regeneration on the second path (path Y) is adjusted so that the two samples of heeimoule essonpe enn tt bb enual.

8 Claims, 1 Drawing Sheet

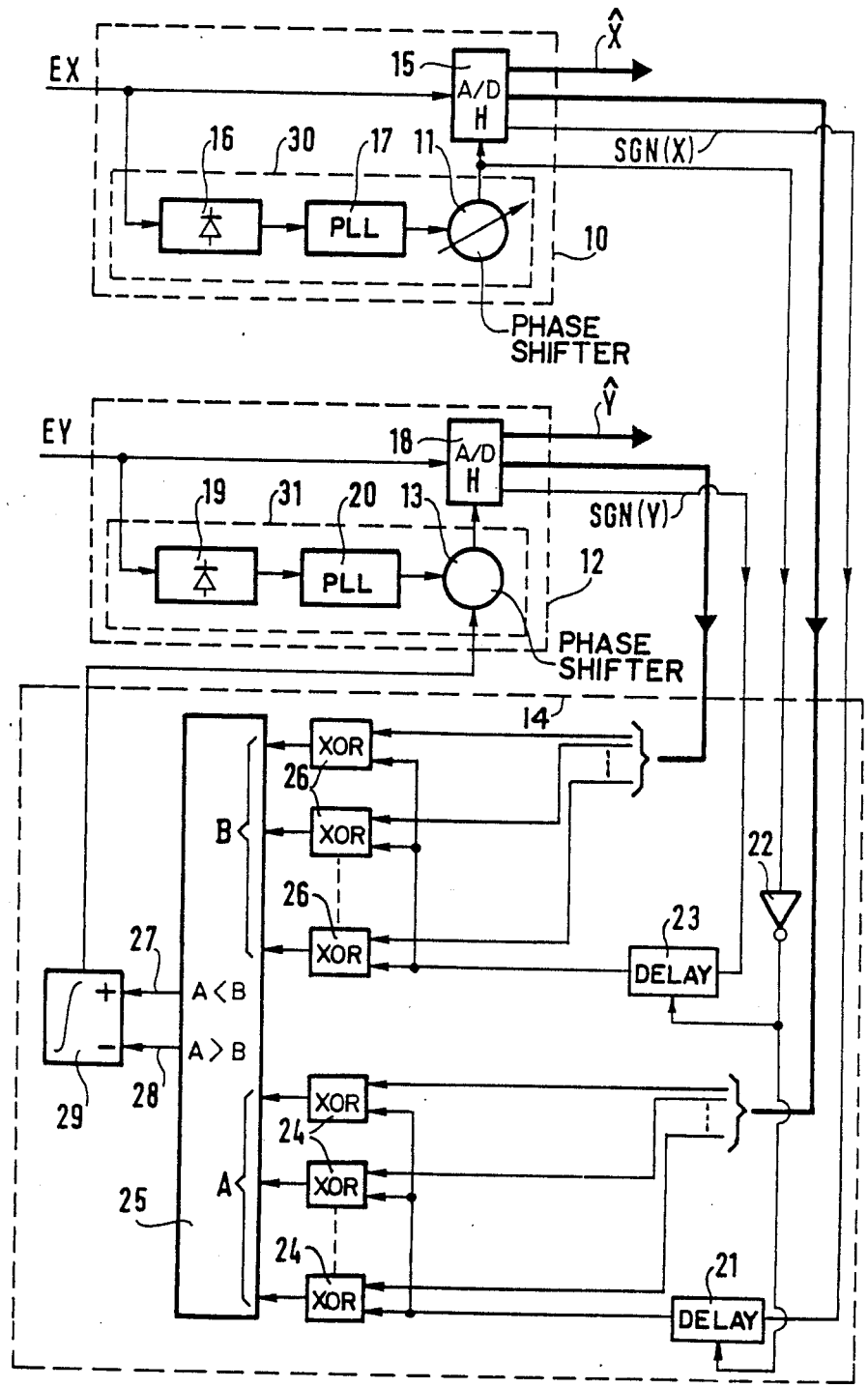

METHOD OF SERVO-CONTROLLING THE INSTANT OF REGENERATION IN A DIGITAL TRANSMISSION IN WHICH A CARRIER IS MODULATED ALONG TWO AXES IN QUADRATURE, AND APPARATUS FOR IMPLEMENTING THE METHOD

The invention relates to a method of servo-controlling the instant of regeneration in a digital transmission in which a carrier is modulated along two axes in quadrature, and to apparatus for implementing the method.

The invention relates to regenerating the signals received in a digital transmission, more particularly when using digital microwave beams, and in particular when a time equalizer is used at intermediate frequency.

BACKGROUND OF THE INVENTION

When considering digital transmission based on amplitude and phase modulation and demodulation of a carrier along two axes in quadrature, a technical problem arises concerning the ideal positioning for the instant of regeneration on each of the X and Y paths on reception of the demodulated signal.

In order to ensure that a proper decision is performed on reception, i.e. that a decision is performed such that the regenerated signal is identical to the transmitted signal, it is essential for the decision instant employed on each of the X and Y paths to be as close as possible to the optimum decision instant.

Unfortunately, not only must the regeneration clock be recovered by processing the received signal, but also the time equalilzer which is controlled by information taken from the received signal at the instants of regeneration disturbs certain methods of recovering the modulation clock.

Thus, the clock servo-control method described in the article by K. H. Mueller, and M. Müeller entitled "Timing recovery in digital synchronous data receivers" published in IEEE Trans. on Comm., May 1976 is defeated by the presence of a time equalizer (at intermediate frequency or in baseband) which flattens out the phase characteristic.

The method of servo-controlling the clock described in the article by H. Sari, et al, entitled "Minimum mean-square error timing recovery schemes for digital dequalizers" published in IEEE Trans. on Comm., May 1986 cannot be implemented simultaneously on both the X and the Y paths because of the coupling induced by time equalization at intermediate frequency (the servo-control on one path flattens out the phase characteristic of the servo-control on the other path because of the coupling induced by time equalization at intermediate frequency).

In another prior art circuit, a clock frequency spectrum line is regenerated on each path (by means of a non-linear circuit applied to the signal, e.g. a differentiator detecting the passes of the signal through its mean level, thus creating a clock rate spectrum line), and this frequency line is then synchronized by means of a phase-locked loop (thus performing narrow band filtering which ensures that the recovered clock is relatively noise-free). Finally, a phase shifter which is manually adjusted during a set-up procedure (in which a minimum error rate is sought in the presence of thermal noise) serves to sample the received signal at the optimum phase.

This solution suffers from the severe drawback of requiring phase shifters to be manually adjusted for both the X and the Y paths in order to obtain a minimum error rate in the presence of thermal noise. Unfortunately, the error rate depends simultaneously on two different parameters (since the regenerated digital signals from the X and Y paths are multiplexed), thereby requiring the search for the optimum to proceed by repeated adjustments.

Further, phase drift due to various factors (ageing, temperature, variation of power supply voltage, etc.) is not compensated in satisfactory manner: only such drift as is common to both paths (common mode) is compensated by the time equalizer, whereas differential drift cannot be compensated in this way and reduces receiver performance.

The object of the invention is to mitigate these drawbacks.

SUMMARY OF THE INVENTION

The present invention provides a method of servo-controlling the instant of regeneration in a digital transmission in which a carrier is modulated along two axes in quadrature, in which the optimum instant of regeneration is sought on one of the paths (path X) by manual adjustment, wherein two corresponding samples of the phase impulse response on the two paths are compared and the offset of the instant of regeneration on the second path (path Y) is adjusted so that the two samples of the impulse response tend to be equal.

The present invention also provides apparatus for implementing this method and comprising:

a manually adjusted first regenerator circuit for one of the paths (path X);

an electrically controlled second regenerator circuit relating to the other path (path Y); and a comparator circuit for comparing the output signals from these two regenerator circuits and for controlling the second regenerator circuit.

Advantageously, the first and second regenerator circuits respectively comprise first and second analog-to-digital converters each disposed between the input and the output of the corresponding path, and first and second clock recovery circuits each disposed between the input of the corresponding path and a clock input of the corresponding analog-to-digital converter. The first clock recovery circuit comprises, in series: a non-linear device, a phase-locked loop, and a manually adjustable first phase shifter. The second clock recovery circuit comprises, in series: a second non-linear device, a second phase-locked loop, and an electrically controlled second phase shifter.

BRIEF DESCRIPTION OF THE DRAWING

An embodiment of the invention is described by way of example with reference to the sole Figure of the accompanying drawing, which shows apparatus for implementing the method of the invention.

MORE DETAILED DESCRIPTION

The invention consists in minimizing asymmetry between the instants of regeneration on the X and the Y paths. The method of the invention thus aims at ensuring that the servo-controlled path (e.g. Y) has the same offset for its instant of regeneration (relative to the optimum for said path, in this case Y) as the reference path (in this case X).

In order to estimate this offset difference, two corresponding samples of the phase impulse response on the X and Y paths are comared (e.g. hp1x and hp1y which are samples taken at instants t=T, where T is the unit time interval between transmitting two successive symbols, said samples being taken from the phase portion of the impulse response respectively on path X and on path Y), and the offset for the instant of regeneration on the Y path is adjusted to make the two samples of the impulse response equal to each other, thereby ensuring identical offsets in the instant of regeneration on both paths.

The common offset is subsequently corrected by the time equalizer (assuming that the offset is not too large, as is expected in the present case).

This method thus has two advantages:

it makes adjustment easier since there is only one phase shifter to adjust, and this can be done in a single operation; and differential drift (e.g. due to temperature, ageing, ...) is taken up automatically.

The main advantage of the invention is improved performance.

The Figure shows apparatus for implementing the method of the invention.

The apparatus comprises:

a manually-adjusted first regenerator circuit 10 relating to one of the paths (path X in the figure);

an electrically-controlled second regenerator circuit 12 relating to the other path (path Y in the figure); and a comparator circuit 14 for comparing the output signals from these two regenerator circuits and controlling the second regenerator circuit.

When using $2^{2M}$ quadrature amplitude modulation (QAM), for example, the first regenerator circuit 10 relating to the path X comprises firstly a first N-bit analog-to-digital converter 15 disposed between its input EX and its output, and secondly a clock recovery circuit 30 for said path X disposed between the input EX and the clock input H of the converter 15 and comprising a series connection of a first non-linear device 16, a first phase locked loop 17, and a manually-adjustable first phase shifter 11.

The second regenerator circuit 12 comprises the same items interconnected in the same way as the first circuit 10, i.e. firstly a second N-bit analog-to-digital converter 18, and secondly a clock recovery circuit 31 for said path Y constituted by a series connection of a second non-linear device 19, a phase locked loop 20, and an electrically-adjustable second phase shifter 13.

The outputs from the converters 15 and 18 respectively provide a M-bit decision signal $\hat{X}$ on X, and a M-bit decision signal $\hat{Y}$ on Y.

The comparator circuit 14 receives firstly the N-M first bits representative of the error signal on the first path from the first converter 15, and secondly the N-M second bits representative of the error signal of the second path from the second converter 18.

The N-M first bits (path X) are applied to N-M first exclusive OR gates 24 whose outputs are connected to N-M first inputs A of an N-M bit comparator 25, and the N-M second bits (path Y) are applied to N-M second exclusive OR gates 26 whose outputs are connected to the N-M second inputs (B) of the comparator 25.

The second input of each of the N-M first exclusive OR gates 24 is connected to the output from a first delay cell 21 whose input receives a signal (SGN(X)) from the first converter 15 representative of the sign of X, and whose clock input receives the signal from the first phase shifter after it has passed through an inverter 22.

Similarly, the second input of each of the N-M second exclusive OR gates 26 is connected to the output of a second delay cell 23 whose input receives a signal (SGN(Y)) from the second converter 18 and representative of the sign of Y, and whose clock input receives the signal output by the inverter 22.

The comparator 25 has two output 27 and 28 respectively representative of A<B and A>B which are connected to + and − inputs respectively of an analog integrator 29 whose output is connected to the control input of the second phase shifter 13.

In order to evaluate the difference between the relative decision instants, the following quantities are compared: $sgn(Xr[nT]) \cdot Ex[(n+1)T]$ on the path X and $sgn(Yr[nT]) \cdot Ey[(n+1)T]$ on the path Y, where $sgn(Xr[nT])$ represented by the most significant bit of the converter designates the sign of the signal sampled at instant nT on the path X, and $Ex[(n+1)T]$, represented in practice by the N-M least significant bits of the converter designates the error signal sampled at the instant (n+1)T on the path X. N is the number of converter bits and M is the number of bits associated with QAM: for example M=3 for 64 QAM and if N=6, then the error signal is represented on 3 bits.

The expression:

$$E(sgn(Xr[nT]) \cdot Ex[(n+1)T] - sgn(Yr[nT]) \cdot Ey[(n+1)T]),$$

in which the symbol E designates mathematical expectation, is proportional to hp1x-hp1y. The signal associated with this expression controls the phase shifter on the path Y so as to minimize the expression.

Naturally the present invention has been described and shown merely by way of preferred example, and its component parts could be replaced by equivalent parts without thereby going beyond the scope of the invention.

Thus, any phase estimator fo the type:

$$E(sgn(Xr[nT]) \cdot Ex[(n+i)T] - sgn(Yr[nT]) \cdot EY[(n+i)T])$$

where i is a non-zero relative integer could be used, and more particularly i=−1 could be used.

I claim:

1. A method of recovering two clock signals corresponding to the optimum instant of regeneration for each of two carrier components in quadrature relationship, each said carrier component being separately modulated with respective digital information and separately processed via a respective processing path, comprising initializing a first recovered clock signal defining the instant of regeneration for regenerating the first digital information from the first carrier component by manual adjustment of the phase of the first recovered clock signal, comparing corresponding offset signals representative of samples of the phase impulse response on the two paths and of any phase offsets of the two respective recovered clocks from respective optimal phases and servo-controlling the phase of the second recovered clock so that the two offsets tend both to equal a common offset, whereby asymmetry in the respective impulse response of each of the processing paths caused by any differential drift of the two carrier components is minimized.

2. A method according to claim 1, wherein said common offset is compensated in a time equalization circuit, whereby optimal impulse response may be maintained in both processing paths.

3. Apparatus for receiving a digital transmission comprising two carrier components in quadrature relationship, each independently modulated with respective digital information, the apparatus comprising:

a first regenerator circuit including a first clock recovery circuit whose output phase is manually adjustable, for producing information signals and clock phase offset signals relating to the first carrier component;

a second regenerator circuit including a second clock recovery circuit for producing information signals and clock phase offset signals relating to the second carrier component; and a comparator circuit for comparing the clock phase offset signals from these two regenerator circuits and means for automatically controlling the output phase of only the second clock recovery circuit such that its phase offset signals tend to approximate those from the first regenerator circuit.

4. Apparatus according to claim 3, wherein the first and second regenerator circuits respectively comprise first and second analog-to-digital converters each disposed between the input and the output of the corresponding processing path of the regenerator circuit, and said first and second clock recovery circuits each are disposed between the input of the corresponding path and a clock input of the corresponding analog-to-digital converter.

5. Apparatus according to claim 3, wherein the first clock recovery circuit comprises, in series:
a first nonlinear device,
a first phase-locked loop, and
a manually-adjustable first phase shifter.

6. Apparatus according to claim 5, wherein the second clock recovery circuit comprises, in series:
a second nonlinear device,
a second phase-locked loop, and
an electrically-controlled second phase shifter.

7. Apparatus according to claim 4, wherein the comparator circuit comprises a comparator which receives signals from the first converter on first inputs and signals from the second converter on second inputs.

8. Apparatus according to claim 4 particularly adapted for use with $2^{2M}$ QAM type modulation, wherein each of the converters produces an N-bit output, the comparator circuit receives firstly N-M first bits representative of the error signal on the first path coming from the first converter and secondly N-M second bits representative of the error signal on the second parth and coming from the second converter, the N-M first bits are input to N-M first exclusive OR gates whose outputs are connected to the N-M first inputs of an N-M comparator, the N-M second bits are input to N-M second exclusive OR gates whose outputs are connected to the N-M second inputs of the comparator, the second input of each of the N-M first exclusive OR gates is connected to the respective output of a first delay cell whose input receives a signal delivered by the first converter and representative of the sign of the recovered first quadrature component X and whose clock input receives the signal delivered by the first phase shifter after passing through an invertor, and the second input of each of the N-M second exclusive OR gates being connected to the output of a second delay cell whose input receives a signal sgn(Y) delivered by the second converter representative of the sign of the second recovered quadrature component and whose clock input receives the signal from said invertor, said comparator having two outputs respectively representative of the phase offset of the first recovered quadrature component being less than and greater than the phase offset of the second recovered quadrature component which are respectively connected to the + and the − inputs of an analog integrator whose output is connected to the control input of the second phase shifter.

* * * * *

UNITED STATES PATENT AND TRADEMARK OFFICE
CERTIFICATE OF CORRECTION

PATENT NO. : 4,956,853
DATED : September 11, 1990
INVENTOR(S) : Olivier De Luca

It is certified that error appears in the above-identified patent and that said Letters Patent is hereby corrected as shown below:

On the title page:

Abstract, line 10, change "heeimoule essonpe enn tt bb enual"
        to -- the impulse response tend to be equal --.

Column 1, lines 46,47, change "dequalizers" to
        -- equalizers --.

Column 3, line 3, change "comared" to -- compared --.
Column 3, line 20, move the closing parenthesis to come after
        "ageing, . . . ."

Column 4, line 41, change "fo" to -- of --.

Column 6, line 15, change "parth" to -- path --.

Signed and Sealed this

Fifth Day of May, 1992

Attest:

DOUGLAS B. COMER

Attesting Officer     Acting Commissioner of Patents and Trademarks